United States Patent [19]
Shlien

[11] Patent Number: 4,949,023
[45] Date of Patent: Aug. 14, 1990

[54] DIRECT CURRENT MACHINE WITH SWITCHABLE STATOR WINDINGS

[76] Inventor: David J. Shlien, 6716 Leland Way, Hollywood, Calif. 90028

[21] Appl. No.: 263,235

[22] Filed: Oct. 27, 1988

[51] Int. Cl.$^5$ ............................................ H02K 23/48
[52] U.S. Cl. .................................. 318/541; 318/538; 318/539; 318/480; 310/229
[58] Field of Search ................ 318/138, 244, 245, 246, 318/247, 254, 497, 498, 538, 539, 541, 480; 310/46, 229, 230, 231, 248

[56] References Cited

U.S. PATENT DOCUMENTS

| | | | |
|---|---|---|---|
| 2,460,415 | 2/1949 | Gaylord et al. | 318/497 |
| 2,664,473 | 12/1953 | Brown | 318/497 X |
| 2,993,159 | 7/1961 | Devol | 318/254 |
| 3,229,179 | 1/1966 | Hetzel | 318/138 |
| 3,242,404 | 3/1966 | Favre | 310/46 X |
| 3,419,782 | 12/1968 | Sheldrake et al. | 318/138 X |
| 4,024,446 | 5/1977 | Burnett | 318/685 |
| 4,208,601 | 6/1980 | Tardieu | 310/231 |
| 4,273,334 | 6/1981 | Schone et al. | 318/480 |

*Primary Examiner*—Bentsu Ro
*Attorney, Agent, or Firm*—Sanford Astor

[57] ABSTRACT

A direct current machine construction in which the rotor includes a permanent magnet with the stator including winding energizable from a direct current source. In a first embodiment first and second stationary slip rings are connected to an external direct current source. Coupled for rotation with the shaft are to first and second brush assemblies with brushes which are spring biased and protrude radially outwardly from the rotor shaft. The commutator for the windings is stationary relative to the housing and includes a plurality of commutator segments positioned intermediate the slip rings and in a cylindrical manner facing inwardly toward, and for contact with, the commutator brushes. The windings are on the stator with the winding leads being accessible externally of the stator for enabling switching devices to be utilized for changing of the number of turns of the stator windings for thereby varying the motor characteristics, as needed. The switching devices may be mechanical switch devices or static semiconductor switch devices. In a second embodiment, commutation is effected by non-contact position sensing devices, such as encoder wheels, optical devices and the like, operable in response to a rotating device keyed to the rotor shaft, which device is positioned for electromagnetic accuracy relative to the pole positions of the stator of the machine. With accessible external leads, the machine may be alternately used as a propulsion motor, generator or alternator in the same device for returning power to the direct current source.

27 Claims, 2 Drawing Sheets

DIRECT CURRENT MACHINE WITH SWITCHABLE STATOR WINDINGS

This invention is disclosed in my Disclosure Document filed in the Patent Office on Feb. 29, 1988.

BACKGROUND OF THE INVENTION

The background of the invention will be discussed in two parts.

FIELD OF THE INVENTION

This invention relates to motors or generators, and more particularly, to a direct current machine employing a rotating permanent magnet electromagnetically coacting with windings in the stator.

DESCRIPTION OF THE PRIOR ART

Direct current motors of conventional design employ a stator with a field winding connectable to a power source, and a rotor with a plurality of windings connectable, via a commutator, to a power source. The commutator is coupled to the rotor shaft for rotation therewith and alternates the polarity of the applied direct current to the rotor windings to thus change the electromagnetic polarity of the rotor windings relative to the stator windings.

Some prior art direct current motors employ permanent magnets in either the stator or rotor structure. One such motor is shown and described in U.S. Pat. No. 3,419,740, entitled "Self Commutated Direct Current Motor with Permanent Magnet Rotor", such patent issuing to Dotto on Dec. 31, 1968. The motor includes a permanent magnet rotor and a stator including a plurality of windings. Commutation of the windings is effected through first and second brushes coupled to the windings and actuable by a commutator coupled to the rotor shaft.

In accordance with an aspect of the invention, it is accordingly an object of the invention to provide a new and improved direct current machine and a new and improved commutator arrangement.

SUMMARY OF THE INVENTION

The foregoing and other objects of the invention are accomplished by providing a direct current machine construction in which the rotor includes a permanent magnet with the stator including windings energizable from a direct current source. In a first embodiment first and second stationary slip rings are connected to an extremely direct current source. Coupled for rotation with the shaft are to first and second brush assemblies with brushes which are spring biased and protrude radially outwardly from the rotor shaft. The commutator for the windings is stationary relative to the housing and includes a plurality of commutator segments positioned intermediate the slip rings and in a cylindrical manner facing inwardly toward, and for contact with, the commutator brushes. The windings are on the stator with the winding leads winding being accessible externally of the stator for enabling switching devices to be utilized for changing of the number of turns of the stator windings for thereby varying the motor characteristics, as needed. The switching devices may be mechanical switch devices or static semiconductor switch devices.

In a second embodiment, commutation is effected by non-contact position sensing devices, such as encoder wheels, optical devices and the like, operable in response to a rotating device keyed to the rotor shaft, which device is positioned or electromagnetic accuracy relative to the pole positions of the stator of the machine. With accessible external leads, the machine may be used as a propulsion motor, generator, or alternator in the same device, for returning power to the direct current source.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
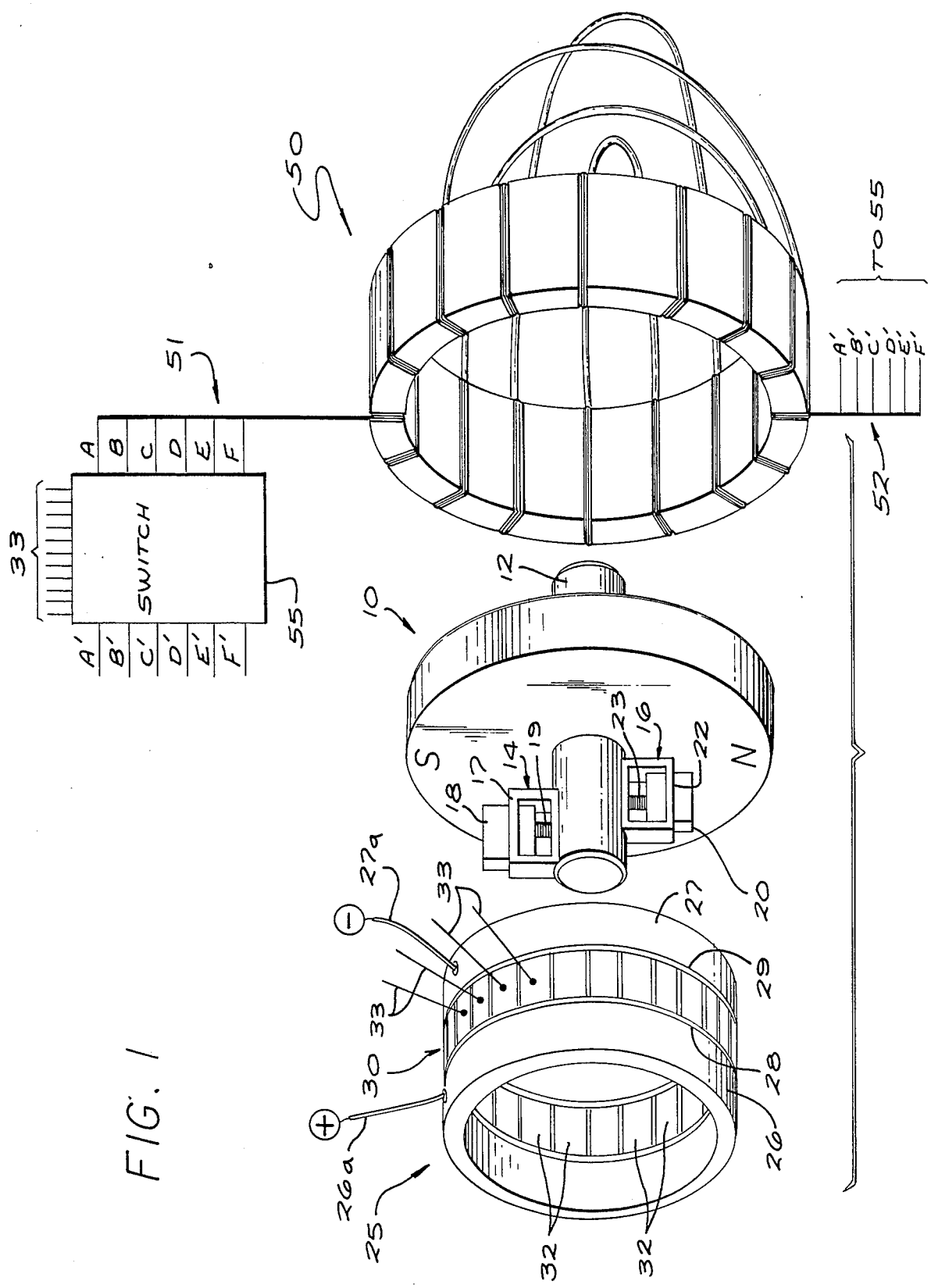
FIG. 1 is an exploded perspective view showing a first embodiment of the direct current machine according to the invention.

Referring now to the drawings, and particularly to FIG. 1, there is shown an exploded perspective view of the components of a direct current machine, such as a motor, in accordance with the invention. The motor housing has been eliminated to show the interior components, which include rotating permanent magnet 10, carried on a shaft 12. The rotor magnet 10 has been selected as a two pole rotor since, as will become apparent, such a motor lends itself to the operation as stepping motor or a synchronously operating motor.

Coupled to the shaft 12 are first and second diametrically opposed commutator brush assemblies, generally designated 14, 16. Each of the brush assemblies is generally identical and by reference to brush assembly 14, includes a generally rectangular housing 17 configured for slidably receiving a brush member 18 therein with a spring bias member 19 within the housing 17 urging the brush member 18 radially outwardly.

Similarly, the brush assembly 16 includes a brush member 20 within a housing 22, with a spring bias member 23 urging the brush member 20 radially outwardly. The brush assemblies 14 and 16 are assembled on shaft 12 with the upper (as viewed in the drawings) brush assembly 14 being axially offset from the lower assembly 16 in a direction away from the rotor magnet 10. The purpose of this offset will be discussed hereafter in connection with the construction of the commutator, generally designated 30.

The brushes 18, 20 of the commutator brush assemblies 14, 16, engage an electrical current transfer assembly, generally designated 25, the transfer assembly 25 being constructed for attachment in fixed relation to the housing, and, hence, the stator. As will become apparent, the commutator 30 of this invention is basically an inside-out version of a traditional commutator, and, further, it will become apparent that the components are functioning in the reverse of a conventional direct current motor, that is, the windings of the stator act as the armature in a conventional motor.

The commutator 30 is configured in a cylindrical array of inwardly facing arcuate (in cross-section) commutator segments 32, separated by intervening insulation segments 33, the number of commutator segments 32 corresponding to twice the number of discrete winding sets in the windings of the stator (or armature), generally designated 50. Each commutator segment 32 has connected thereto on the exterior thereof, a lead wire 33, only three of which are shown, with these lead wires being connected to the windings of the stator 50 or to an intermediate switch device, which will be described hereinafter.

Secured to the commutator 30, on either side thereof, are first and second slip rings 26, 27, which are electrically insulated from the commutator 30 by insulation rings 28 and 29, yet secured in concentric abutting relation therewith. The internal surface of each of the slip rings 26, 27 is of the same internal diameter, and the same internal diameter as the internal diameter of the commutator 30. The slip rings 26 and 27 receive direct current from an external source, such as a battery though electrical leads 26a and 27a, respectively connected thereto. The external direct current source can be a storage battery (not shown), the polarity of which is designated by "+" and "−" in circles adjacent the ends of leads 26a and 27a.

As assembled, the brushes 18 and 20 of the brush assemblies 14 and 16 abuttingly contact the ride against the inner surface of the electrical current transfer assembly 25. Because of the axial offset of brush assembly 14 relative to assembly 16, the following occurs—the upper brush assembly 14 makes electrical contact with only the axially outer slip ring 26 and the commutator segments 32 of the commutator 30. The lower brush assembly 16 makes electrical contact only with the inner slip ring 27 and the segments 32 of the commutator 30.

Thus, for a given position of the brushes 18 and 20 relative to the transfer assembly 25, current enters from the positive terminal (+) of the battery through the slip ring 26, then through the brush 18 which bridges the insulation 28 to the contact both the slip ring 26 and the adjacent commutator segment 33, but not the slip ring 27. This current then flows through the connected windings of the stator, generally designated 50, in a manner to be described.

The current from the stator windings returns through the diametrically opposite commutator segment 33 of commutator 30, thence through the brush 20, which spans or bridges the insulation 29 between the segment 33 and the adjacent slip ring 27, and then to the negative pole of the power source.

The stator 50 is wound in a conventional manner, that is, it includes a generally cylindrical ferromagnetic core of generally conventional configuration with slots or spaces for receiving the windings therein. However, the winding sets are arranged for termination externally to an intermediate switch device, shown schematically and designated 55.

The terminal ends of the winding leads are shown in two sets, generally designated 51 and 52. Six leads are shown, with the leads of set 51 being designated by reference characters "A", "B", "C", "D", "E", and "F". Similarly, the leads of set 52 are designated with the same reference characters followed by a prime ('), that is "A'", "B'", etc.

The switch is shown as a block 55, with the leads 33 from the commutator coming into the switch 55. On the opposing sides of switch 55, the winding leads A–F of set 51 and the winding leads A'–F' of set 52 are connected to the switch 55.

The switch 55 can be a ganged two pole switch capable of handling the number of lead terminations from the windings and commutator segments for enabling switching of the windings of the stator 50 from series connected to parallel connected, or for changing the number of turns in a winding, as desired. Alternative switch arrangements may be utilized for various purposes, such as to change the number of poles on the stator if desired, or to couple two windings in series or the like, all consistent with the characteristics desired for the motor.

In effect with the motor of the above construction, unlike conventional direct current motors, the commutator itself is not rotating. In a prior art conventional motor, the commutator is used with the rotor, which is also referred to as the armature. In a conventional motor, the windings are on the armature, which is rotating. Windings on the rotating armature are susceptible to damage occasioned by centrifugal forces.

However, in the motor of the instant invention, the commutator acts in conjunction with the windings on the stator, which, in this configuration, acts as a non-rotation armature. Since this armature is not rotating, it is then easy to manipulate the turns ration of the windings which have the lead sets 51 and 52 terminating external to the housing, and thus, readily controllable. Instead of having a series of commutators, all that is needed is a double pole ganged switch, a rotary switch or any other kind of switch, including utilization of controllable semiconductor switches, and you can switch the number of turns in the armature or stator 50, which does not rotate.

Figure 2:
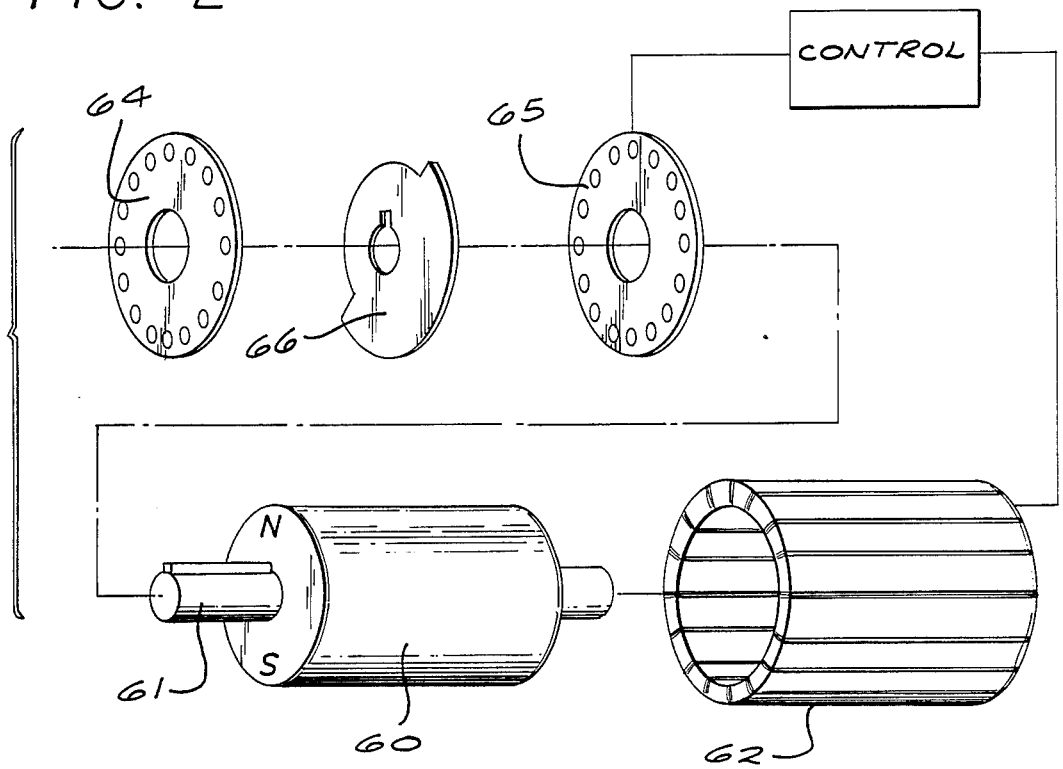
FIG. 2 is an exploded perspective view of an alternate embodiment of a direct current machine according to the invention.

FIG. 2 shows an alternate embodiment of a motor in accordance with the invention, in which the rotor 60 is a cylindrically configured two pole permanent magnet which rotates within a stator 62, which is configured like stator 50 with the leads terminating external to the housing for switching. Commutating is effected in a non contacting manner, with a photo-optical arrangement including first and second disks, 64, 65 with an intervening mask.

The mask 66 is keyed to the shaft 61 of the rotor 60, for rotation therewith. The two disks 64 and 65 have central apertures for passage of the rotor shaft 61 therethrough, with discs 64 and 65 being mounted in close proximate parallel relation with mask 66 and disk 65 being mounted to the right thereof. The two disks are mounted stationary relative to the housing in any convenient manner.

Disk 64 acts as a substrate which contains a plurality of equiangularly positioned light emitting diodes, while disk 65 acts as a substrate which has assembled thereto a like number of equiangularly positioned phototransistor devices in aligned relation with the corresponding light emitting diode. The number of diodes on disk 64 and light sensing transistors on disk 65 would essentially correspond to the number of commutator segments required in the motor, such as the segments 32 of commutator 30.

The light emitting diodes of disk 64 would be connected to a suitable d.c. source, and the leads from phototransistors on disk 65 would be connected to a suitable control circuit. The mask 65 may take any convenient configuration for interrupting or providing selective energization of the phototransistors of disk 65 in a sequence determined by the mask 65. In this instance, the mask 65 has an arcuate segment of about 180 degrees removed, thus masking one half of the light paths at a time this thereby provides a brushless motor which can be operated for either synchronous, stepping or sparkless operation.

Also, in accordance with the instant invention, by selection the proper coils for the armature, the static armature, the motor can be used in an alternator mode and put out either single phase, split phase or three phase, or however many phases are desired for rectification and filtration where the device can be 20 or more simultaneous phases, with each phase shifted a slight angle relative to the next to provide very smooth and easily filtered direct current. One may configure coils separated by 12 degrees to get three phases, or whatever need for the particular transformer.

The motor of the present invention is particularly well suited to automotive use whereby the static armature and static commutator arrangement enables easy switching for speed control or charging rate control, depending on whether the vehicle is speeding up or slowing down, and, thereby renders it possible to utilize the device for propulsion. With proper switching, and storage battery operation, the device may be utilized as a propulsion motor, and, when conditions permit, such as during movement downhill, the device may be used for braking while returning power to the battery. In effect, during downhill operation, the device acts as a generator, deriving power from the force of gravity. This is particularly true of the motor of FIG. 1, in which the slip ring and commutator arrangement could readily handle the power for such uses, and the brushes make it virtually 100% efficient with respect to transfer of power from the device of the battery.

Figure 3:
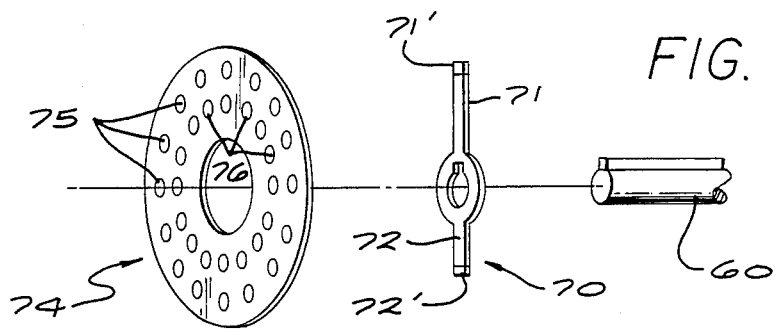
FIG. 3 is an exploded partial perspective view of an alternative commutation arrangement for use in the machine of FIG. 2.

FIG. 3 shows another alternate commutator arrangement in which shaft position sensing is accomplished via a member, generally designated 70, keyed to shaft 60 for rotation therewith, the member 70 having pair of diametrically opposed arms 71 and 72, each having a feromagnetic or iron slug 71', 72', respectively, at the end thereof. One arm 70 is longer than the other arm 71. A stationary disc member 74 is mounted to the housing in proximate relation to the rotation member 70, the disk member 74 including an outer circle 75 of proximity coils and an inner circle 76 of proximity coils, the coils of each circle being arranged circumferentially and in equiangular orientation thereon.

The slug 71' coacts with the outer circle 75 while the slug 72' coacts with the inner circle 76. Although not shown, it is to be understood that the proximity coils of the circles 75 and 76 would be connected to external circuitry, such as a switch device, for interconnection to the windings of the stator.

Figure 4:
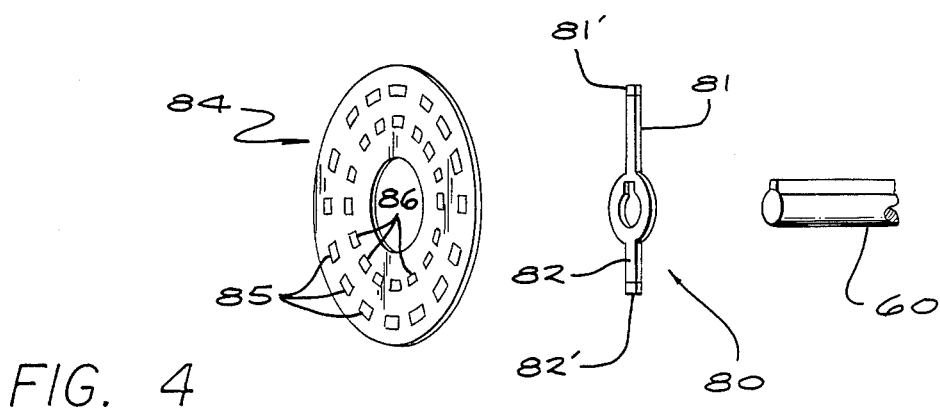
FIG. 4 is an exploded partial perspective view of still another commutation arrangement for use in the motor of FIG. 2.

Still another commutator arrangement is shown in FIG. 4, which is similar to that of FIG. 3. In FIG. 4, however, capacitance coupling is effected, with a rotating member, generally designated 80, rotatably coupled to rotor shaft 60. The member 80 includes diametrically opposed arms 81, 82, with grounded capacitive plates 81', 82', at the ends thereof.

A stationary disc member 84 is mounted to the housing in proximate relation to the rotating member 80, the disk member 84 including an outer circle 85 of capacitive plates and an inner circle 86 of capacitive plates, the plates of each circle being arranged circumferentially and in equiangular orientation thereon. The grounded plate 81' coacts with the outer circle 85 of capacitive plates, while the grounded plate 82" coacts with the inner circle 86 of capacitive plates. Although not shown, it is to be understood that the capacitive plates of the circles 85 and 86 would be connected to external circuitry for interconnection to the windings of the stator.

Thus, it can be seen that the commutator arrangements of FIGS. 2, 3 and 4, provide for brushless, sparkles operation of the motor device according to the invention. While there has been shown and described a preferred embodiment, it is to be understood that various other adaptations and modifications may be made within the spirit and scope of the invention.

What is claimed is:

1. In a direct current machine, the combination comprising a permanent magnet rotor means having a rotor shaft; commutator means, said commutator means including at least first and second radially outwardly extending brush means connected for rotation with said rotor means, first and second stationary slip rings and a stationary group of commutator segments arranged in a cylindrical configuration, and wherein said brush means, said slip rings and said commutator segments are positioned, configured and arranged for enabling said first brush means to simultaneously contact a commutator segment and said first slip ring, and for enabling said second brush means to simultaneously contact a different commutator segment and said second slip ring; switch means; stator means including a plurality of poles, each pole including a plurality of windings with the ends of at least some of the windings being electrically connected to said switch means; and means interconnecting said commutator means and said switch means for enabling varying the interconnection of said windings whereby to alter the operating characteristics of said machine.

2. The machine according to claim 1 wherein there are two brush means arranged on said rotor shaft in diametrical relation.

3. The machine according to claim 2 wherein said commutator segments are intermediate and in proximate relation to said first and second slip rings, and one of said brush means is axially offset relative to the other along said rotor shaft.

4. In a direct current machine, the combination comprising a permanent magnet rotor means having a rotor shaft; commutator means including shaft position means coupled for rotation with said rotor shaft and stationary sensing means in spaced proximate non-contacting relation to said shaft position means, said shaft position means including a member with diametrically opposed arm portions and said stationary sensing means including first and second coaxial circumferential arrays of sensing devices and wherein said opposed arm portions are of different length, one of said arm portions coacting with one of said circumferential arrays and the other of said arm portions coacting with the other of said circumferential arrays; switch means; stator means including a plurality of poles, each pole including a plurality of windings with the ends of at least some of the windings being electrically connected to said switch means; and means interconnecting said commutator means and said switch means for enabling varying the interconnection of said windings whereby to alter the operating characteristics of said machine.

5. In a direct current machine, the combination comprising a permanent magnet rotor means having a rotor shaft; commutator means including shaft position means coupled for rotation with said rotor shaft and stationary sensing means including proximity detection means in spaced proximate non-contacting relation to said shaft position means including a member of diametrically opposed arm portions, said stationary sensing means including first and second coaxial circumferential arrays of proximity coils on a common substrate, and wherein said opposed arm portions are of different length with each of said arm portions including a metallic slug means at the end thereof, one of said slug means coacting with one of said circumferential arrays and the other of said slug means coacting with the other of said circumferential arrays; switch means; stator means including a plurality of poles, each pole including a plurality of windings with the ends of at least some of the windings being electrically connected to said switch means; and means interconnecting said commutator means and said switch means for enabling varying the interconnection of said windings whereby to alter the operating characteristics of said machine.

6. In a direct current machine, the combination comprising a permanent magnet rotor means having a rotor shaft; commutator means including shaft position means coupled for rotation with said rotor shaft and stationary sensing means including capacitive coupling means in spaced proximate non-contacting relation to said shaft position means including a member of diametrically opposed arm portions, and said stationary sensing means includes first and second coaxial circumferential arrays of capacitive plate means and wherein said opposed arm portions are of different length with each of said arm portions having a capacitor plate member at the end thereof, one of said capacitor plate members coacting with one of said circumferential arrays and the other of said capacitor plate members coacting with the other of said circumferential arrays; switch means; stator means including a plurality of poles, each pole including a plurality of windings with the ends of at least some of the windings being electrically connected to said switch means; and means interconnecting said commutator means and said switch means for enabling varying the interconnection of said windings whereby to alter the operating characteristics of said machine.

7. In a direct current machine, the combination comprising a permanent magnet rotor means having a rotor shaft, stator means including a plurality of poles, each pole including a plurality of windings with ends; at least first and second radially outwardly extending brush means connected for rotation with said rotor means; first and second stationary slip rings and a stationary group of commutator segments collectively arranged in a cylindrical configuration, said brush means, said slip rings and said commutator segments being positioned, configured and arranged for enabling said first brush means to simultaneously contact a commutator segment and said first slip ring, and for enabling said second brush means to simultaneously contact a different commutator segment and said second slip ring; and means electrically interconnecting said commutator segments and said ends of said windings.

8. The machine according to claim 7 wherein there are two brush means arranged on said rotor shaft in diametrical relation.

9. The machine according to claim 8 wherein said commutator segments are intermediate and in proximate relation to said first and second slip rings, and one of said brush means is axially offset relative to the other along said rotor shaft.

10. The machine according to claim 7 wherein said means electrically interconnecting said commutator segments and said ends of said windings includes switch means.

11. In a direct current machine, the combination comprising a permanent magnet rotor means having a rotor shaft; stator means including a plurality of poles, each pole including a winding set having a plurality of windings with ends; shaft position sensing means connected for rotation with said rotor means; stationary sensing means in spaced proximate non-contacting relation to said shaft position sensing means; and means electrically interconnecting said stationary sensing means and said ends of said windings for varying the number of turns of the windings within a winding set whereby to vary the operating characteristics of the machine.

12. The machine according to claim 11 wherein said shaft position sensing means includes a member with diametrically opposed arm portions.

13. The machine according to claim 11 wherein said stationary sensing means includes optical emitting and receiving means.

14. The machine according to claim 13 wherein said optical emitting means includes an array of light emitting devices and said optical receiving means includes a like configured array of photosensitive devices and wherein said shaft position sensing means includes mask means intermediate said light emitting device and said photosensitive devices for enabling selective sequential response from said photosensitive devices.

15. The machine according to claim 11 wherein said stationary sensing means includes proximity detection means.

16. The machine according to claim 11 wherein said stationary sensing means includes capacitive coupling means.

17. In a direct current machine, the combination comprising:
a permanent magnet rotor means having a rotor shaft;
stator means including a plurality of poles, each pole including a plurality of windings with ends;
shaft position sensing means including a member with diametrically opposed arm portions connected for rotation with said rotor means,
stationary sensing means in spaced proximate non-contacting relation to said shaft position sensing means, said stationary sensing means including first and second coaxial circumferential arrays of sensing devices and wherein said opposed arm portions are of different length, one of said arm portions coacting with one of said circumferential arrays and the other of said arm portions coacting with the other of said circumferential arrays; and
means electrically interconnecting said stationary sensing means and said ends of said windings.

18. In a direct current machine, the combination comprising a permanent magnet rotor means having a rotor shaft; stator means including a plurality of poles, each pole including a plurality of windings with ends; shaft position sensing means including proximity detection means connected for rotation with said rotor means; stationary sensing means in spaced proximate non-contacting relation to said shaft position sensing means including a member with diametrically opposed arm portions, said stationary sensing means including first and second coaxial circumferential arrays of proximity coils on a common substrate, and wherein said opposed arm portions are of different length with each of said arm portions including a metallic slug means at the end thereof, one of said slug means coacting with one of said circumferential arrays and the other of said slug means coacting with the other of said circumferential arrays; and means electrically interconnecting said stationary sensing means and said ends of said windings.

19. In a direct current machine, the combination comprising a permanent magnet rotor means having a rotor shaft; stator means including a plurality of poles, each pole including a plurality of windings with ends; shaft position sensing means including capacitive coupling means connected for rotation with said rotor means; stationary sensing means in spaced proximate non-contacting relation to said shaft position sensing means including a member with diametrically opposed arm portions, said stationary sensing means including first and second coaxial circumferential arrays of capacitive plate means and wherein said opposed arm portions are of different length with each of said arm portions having a capacitor plate member at the end thereof, one of said capacitor plate members coacting with one of said circumferential arrays and the other of said capacitor plate members coacting with the other of said circumferential arrays; and means electrically interconnecting said stationary sensing means and said ends of said windings.

20. In a direct current machine, the combination comprising a permanent magnet rotor means having a rotor shaft; commutator means including optical sensing means; switch means; stator means including a plurality of poles, each pole including a winding set of a plurality of windings, said windings being tapped at selected points, said selected points being electrically connected to said switch means; and means interconnecting said commutator means and said switch means for enabling varying the effective number of turns of the pole whereby to alter the operating characteristics of said machine.

21. The machine according to claim 20 wherein said optical sensing means includes a stationary array of light emitting devices, a stationary coresponding array of light sensing devices connected to said switch means, and means intermediate said arrays, said intermediate means being connected for rotation with said rotor means and configured for enablement of selected ones of said light sensing devices.

22. In a direct current machine, the combination comprising a permanent magnet rotor means having a rotor shaft; commutator means; switch means; stator means including a plurality of poles, each pole including a winding set of a plurality of windings, said windings being tapped at selected points, said selected points being electrically connected to said switch means; and means interconnecting said commutator means and said switch means for enabling varying the effective number of turns of the pole whereby to alter the operating characteristics of said machine.

23. The machine according to claim 22 wherein said commutator means includes shaft portion means, said shaft position means having a member with diametrically opposed arm portions.

24. The machine according to claim 22 wherein said commutator means includes sensing means and shaft position means, said sensing means having optical emitting and receiving means.

25. The machine according to claim 24 wherein said optical emitting means includes an array of light emitting devices and said optical receiving means includes a like configured array of photosensitive devices and wherein said shaft position means includes mask means intermediate said light emitting device and said photosensitive devices for enabling selective sequential response from said photosensitive devices.

26. The machine according to claim 24 wherein said sensing means includes proximity detection means.

27. The machine according to claim 24 wherein said sensing means includes capacitive coupling means.

* * * * *